United States Patent [19]

Baudet et al.

[11] 4,246,120

[45] * Jan. 20, 1981

[54] FLUID TREATMENT APPARATUS

[75] Inventors: Jacques Baudet, Roussillon; Michel Salmon, Mions; André Sausse, Sceaux, all of France

[73] Assignee: Rhône-Poulenc S.A., Paris, France

[ * ] Notice: The portion of the term of this patent subsequent to Jun. 15, 1993, has been disclaimed.

[21] Appl. No.: 649,520

[22] Filed: Jan. 15, 1976

Related U.S. Application Data

[62] Division of Ser. No. 475,277, May 31, 1974, Pat. No. 3,963,622.

[30] Foreign Application Priority Data

Jun. 1, 1973 [FR] France ............................... 73 20040
Apr. 2, 1974 [FR] France ............................... 74 11674

[51] Int. Cl.³ ........................ B01D 31/00; A61M 1/03
[52] U.S. Cl. .................................... 210/321.3; 55/158

[58] Field of Search ....................... 210/321 B, 500 M; 55/158; 264/103

[56] References Cited

U.S. PATENT DOCUMENTS

| | | | |
|---|---|---|---|
| 3,198,335 | 8/1965 | Lewis et al. | 210/321 R |
| 3,228,877 | 1/1966 | Mahon | 210/321 B X |
| 3,262,251 | 7/1966 | Hicks, Jr. | 55/158 |
| 3,276,496 | 10/1966 | Lazare | 210/500 M X |
| 3,438,193 | 4/1969 | Kosaka et al. | 264/103 X |
| 3,963,622 | 6/1976 | Baudet et al. | 210/321 B X |

*Primary Examiner*—Frank A. Spear, Jr.
*Attorney, Agent, or Firm*—Cushman, Darby & Cushman

[57] ABSTRACT

Hollow fibre fluid fractionating apparatus in which the hollow fibres are twisted together to form cords which are assembled in a bundle in a fluid fractioning apparatus. The twists in the hollow fibres tend to break up boundary layers around the hollow fibres and improve the fractionating.

5 Claims, 12 Drawing Figures

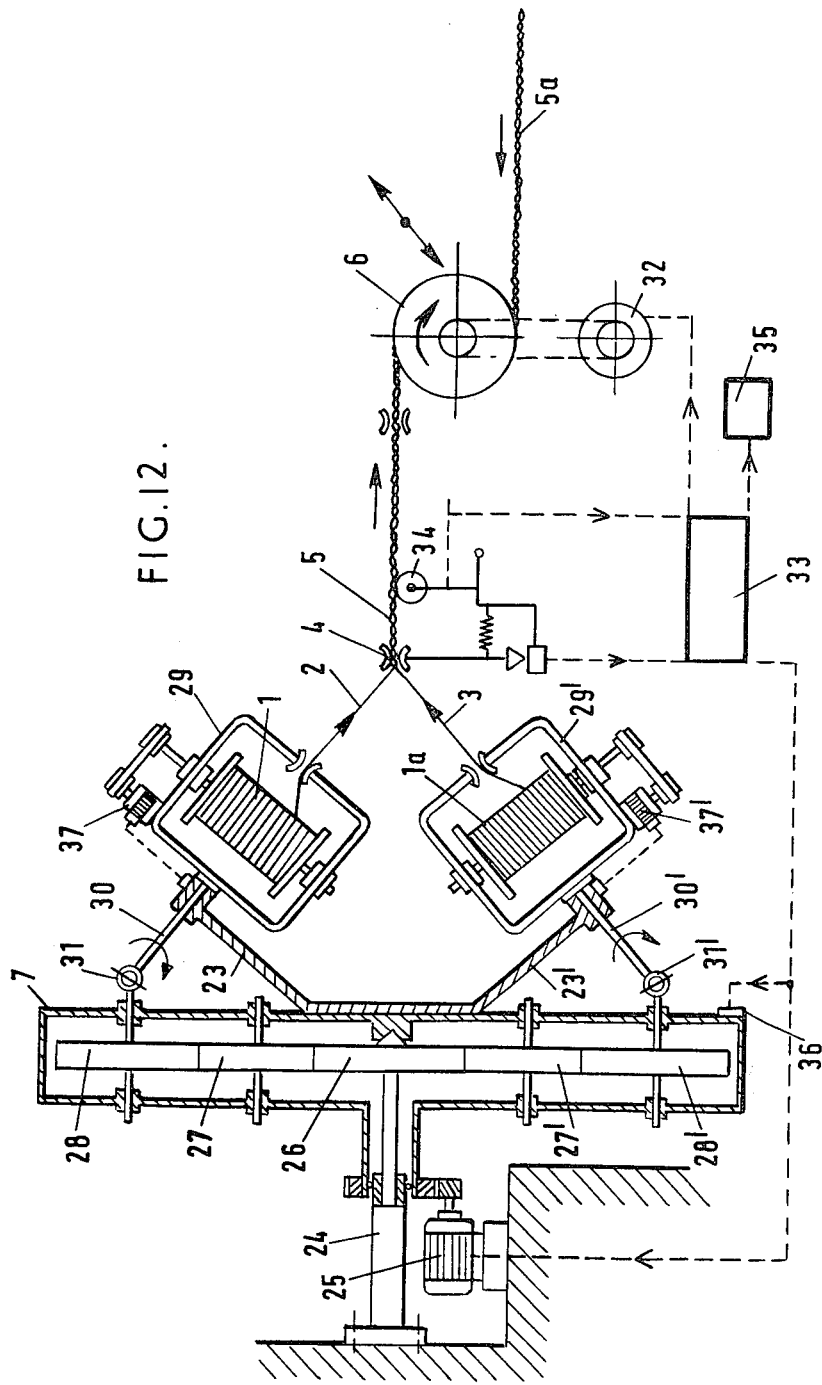

FLUID TREATMENT APPARATUS

This is a divisional of application Ser. No. 475,277 filed May 31, 1974, now U.S. Pat. No. 3,963,622.

The present invention relates to fluid treatment apparatus which are formed with hollow fibres.

The fluid treatments considered in the present account are essentially separation, exchange and mixing operations. As separation operations, there may be mentioned especially ultrafiltration, reverse osmosis, gas permeation, gas diffusion and pervaporation. As exchange operations, there may be mentioned especially dialysis, direct osmosis, gas-gas, liquid-liquid or gas-liquid exchanges and heat exchanges; the artificial kidney involving dialysis falls into this category, as does the artificial lung. Finally, amongst mixing operations, there may be mentioned especially dissolving gases in liquids, vaporisation of liquids in gases and more particularly air conditioning (heat exchange processes being involved) and humidification of gases and of air.

Very many apparatuses with hollow fibres have been proposed for effecting the abovementioned treatments of fluids. For example, French Pat. Nos. 1,227,030, 1,307,979 and 1,340,495 may be mentioned. In all these patents, the hollow fibres are either rectilinear over all, or wholly or partially incurved (this applies especially in the case of bobbins).

In U.S. Pat. No. 3,616,928, it has been proposed to use wavy fibres, this makes it possible for the adjacent fibres not to be parallel, at a given point of the bundle of hollow fibres, because they have a curvilinear shape. This results in an improvement in the performance of the apparatuses, arising from the creation of turbulences inside and especially outside the hollow fibres. These turbulences break up what are called the boundary layers of fluid which tend to form on either side of the dividing walls of the hollow fibres and which form an obstacle to continuing the operations of treating the fluid. In reverse osmosis and ultrafiltration, what is involved is supersaturation upstream from the dividing wall while in dialysis, equalisation of the concentrations of the fluids on either side of the dialysis walls occurs. In every case, these boundary layers tend to cancel out the force gradient which plays a part in bring about the separation, exchange or mixing.

According to the present invention we provide an assembly of hollow fibres for use in a fluid fractionating apparatus, such assembly comprising at least two hollow fibres of macromolecular material, twisted together in the form of a cord.

Such an assembly is simple to produce and the hollow fibres are in a stable state, cannot be deformed easily, are arranged in a uniform manner and are free from points where there are folds.

The invention also provides fluid fractionating apparatus comprising at least one such assembly, a jacket enclosing the or each assembly, means separating the interiors of the various hollow fibres from the exteriors of the hollow fibres within the jacket, at least one passage connecting the interior of the jacket outside the hollow fibres to the exterior and at least one passage connecting the interior of the hollow fibres to the exterior of the jacket.

In operations involving exchange between fluids, the apparatuses according to the invention comprise one inlet passage and one outlet passage for each fluid (in general, two fluids). There are thus generally two inlet passages and two outlet passages (for cases involving two fluids).

In separation operations, there is generally at least one fluid flow inside the apparatus (which implies one fluid inlet passage and one fluid outlet passage). There are thus generally one inlet passage and two outlet passages.

In mixing operations, there are generally a first fluid and a second fluid inside the apparatus, it being necessary to mix the second with the first; the first fluid thus flows through the apparatus (which implies one inlet passage and one outlet passage) and there is an inlet or a flow of the second fluid (which implies one inlet passage and optionally an outlet passage). There are thus generally two inlet passages and at least one outlet passage.

The exact way in which the apparatuses of the invention are made up will not be given in detail (except as relates to the cords of hollow fibres), because the structure of these apparatuses is not a characteristic of the invention. The cords of hollow fibres are preferably parallel and substantially rectilinear but they may or may not be supported and can be in a coil or in a spiral, folded in the shape of a U or arranged perpendicular to one another.

It is understood that, in the present specification, the expression "hollow fibres" denotes fibres of tubular shape, that is to say fibres which contain within them a continuous channel which is positioned substantially along the axis of the fibre and is free from macromolecular material.

The hollow fibres which can be used according to the invention can be of any known type and can be made of any known natural, artificial or synthetic macromolecular material; in particular, the fibres mentioned in French Pat. Nos. 1,307,979, 1,586,563 and 2,017,387 and U.S. Pat. No. 3,674,628 may be involved; these fibres can be homogeneous or microporous or anisotropic (that is to say "with a skin"). They can be prepared by a melt method, by a dry method (evaporation of the solvent) or by a wet method (coagulation); the spinnerets employed are, in practice, sector spinnerets or spinnerets which have annular orifices. The fibres which can be used according to the invention have an internal diameter which is generally less than 1 mm and preferably less than 0.6 mm, and generally greater than 5 $\mu$ and preferably greater than 300 $\mu$.

The exact nature of the hollow fibres is chosen as a function of the application considered (osmosis, dialysis, ultrafiltration, gas permeation, gas-gas or gas-liquid exchanges, heat exchanges and the like).

A distinction will be drawn hereafter between the degree of twisting of the fibres relative to one another in a cord and the degree of twist in the fibres themselves; the twist in the individual fibres is the deformation which a hollow fibre undergoes under the effect of two opposite torques acting in planes perpendicular to the axis of the fibres; the degree of twisting is the longitudinal deformation which a hollow fibre undergoes when the radius of curvature of the axis of the fibre is decreased, that is to say when this fibre is twisted.

The degree of twisting of the fibres in the invention is at least 5 turns per meter (t/m), and is preferably between 30 and 300 t/m. The degree of twist of the individual fibres making up the invention can be positive, zero or negative.

The cords of hollow fibres which can be used in the invention can comprise any number whatsoever of individual hollow fibres; it is even possible to use cords in which one of the fibres is solid and has the function of increasing the strength of the cord. However, cords are preferred in which the number n of hollow fibres is less than 7, and those in which n=2 are preferred still more.

According to another advantageous embodiment of the invention, so-called cords "with no dead volume" are used. These so-called cords "with no dead volume" have the advantage of possessing practically no zone, in the region outside the fibres, where fluids either could not flow or could flow only very slowly.

It must also be stated that, in order to produce a cord with no dead volume, a maximum degree of twisting exists for certain types of cords and that this degree varies according to the nature and the exact dimensional characteristics of the hollow fibres employed. For a cord of n hollow fibres twisted in an ordinary helix, this maximum degree of twisting is achieved when the pitch of the helices is equal to n times the diameter of the fibres.

In order that the invention will be fully understood, the following description is given; purely by way of example, reference being made to the accompanying drawings, in which:

FIGS. 3 to 9 and FIG. 12 are schematic views showing various ways of forming hollow fibre assemblies according to the invention.

Figure 1:
FIGS. 1, 2 and 10 are side elevations of three embodiments of hollow fibre assembly according to the invention.

A first type of hollow fibre assembly or cord is represented in FIG. 1. This is a cord comprising two hollow fibres twisted in the form of a helix; the twisting can be right-handed or left-handed and the hollow fibres are in continuous and quasi-tangential contact. By "quasi-tangential contact" between two fibres, there is to be understood the situation of two fibres which, in a given cross-section, are in contact, only over less than 10%, and preferably less than 1%, of their perimeter. When the degree of twist of the individual fibres is zero, the line of contact of the two hollow fibres is practically a straight line.

Figure 2:

A variant of the cord of FIG. 1 has been represented in FIG. 2. Here the hollow fibres are now in contact only at intervals.

Figure 10:

A third type of hollow fibre assembly is shown in FIG. 10, in which four hollow fibres are divided into two groups each of two fibres, to form two cords, the two fibres of each cord being twisted in a helix of a given direction, and, moreover, the two thus formed cords are twisted together along a curve which also resembles a helix but is twisted in the opposite direction to the helices of the two cords, thus forming a double cord. The process D below describes the production of double cords of this type.

In such a double cord, the information relating to the degree of twisting given above (at least 5 t/m, and preferably 30 to 300 t/m) relates both to each cord of two hollow fibres and to each hollow fibre in a given cord considered on its own.

A double cord comprising four hollow fibres divided into two cords of two fibres has thus been represented in FIG. 10. However, it is equally possible to produce a double cord comprising two cords each having n hollow fibres, the two cords forming a helix in a given direction and the fibres in a given group substantially following a helix of the reverse direction.

The cords or double cords described above are advantageously combined in bundles of parallel cords. Improved uniformity in the flow of the fluids is achieved when, in the said bundles, cords are juxtaposed in alternate order, namely right-handed twisted cords, then left-handed twisted cords, then right-handed twisted cords and so on.

Another type of cord consists of hollow fibres which are practically devoid of torsional stresses, and this applies no matter what their degree of twisting may be. In such a cord at least one of the corded hollow fibres has over at least a part of its length, a twist on itself which is less than about one sixth of a revolution per turn. Such a cord comprises several hollow fibres twisted together in a helix about a common axis.

Twist free cords preferably consist of two hollow fibres twisted in a helix, one around the other. The two hollow fibres are in tangential contact along a straight line which forms the axis of the cord and each hollow fibre does not undergo any rotation on itself along a turn. However, in practice, minimum rotations of a few fractions of a revolution, in one direction or in the opposite direction, can be permitted, and these fractions of a revolution can optionally offset one another. In general about one sixth of a revolution per turn, and preferably about one twelfth of a revolution per turn, is not exceeded.

In the case of two hollow fibres which are twisted on one another and form two imbricated helices, if the external diameter of a hollow fibre is referred to as d, the pitch of the helix as p and the length of a turn as L, it is possible to define each of the helices forming the cord by the relationships:

$$\tan \alpha = \pi d/p;$$

$$L = \pi d/\sin \alpha$$

noting that $\alpha$ is, on the one hand, the angle formed by a tangent to the helix and the line parallel to the axis of the cord drawn from the point of tangency, but is, on the other hand, the angle formed by the diagonal and the long side of a rectangle, the long side of which is equal to the pitch and the short side to the perimeter of the base of the cylinder on which the helix is inscribed.

In order to make it possible to twist a cord with two hollow fibres the pitch p, cannot be less than the diameter d, and it is thus necessary that:

$2 d/\sin \alpha < p$, that is to say $\cos \alpha < 2/\pi$ that is to say $\alpha < 50°30'$ So that the hollow fibre is not subjected to any twist on itself whilst the cord is being twisted, it must revolve on itself by $4\alpha$ per turn in the opposite direction to the twisting direction, $\alpha$ varying from 0 for a helix of infinite pitch to 50°30' for the corresponding pitch $P_0$ and theoretically to 90° for a helix of zero pitch.

If two hollow fibres are twisted simply by twisting two parallel fibres, they each undergo a rotation on themselves of 360° per turn, this rotation always being greater than that which would be necessary to twist them without torsional stress, since $4\alpha < 202°$. The stress of twisting the hollow fibre on itself produced in this way increases whilst the pitch decreases, because the number of revolutions per unit length increases more rapidly than the angle $\alpha$. It is thus seen that if the degree of twisting is increased (the pitch of the helix decreasing) it is thus possible to flatten the hollow fibres. Thus, the cords of practically twist-free hollow fibres are very particularly suitable when the degree of twisting of the hollow fibres is between 50 and 500 turns per meter and preferably between 150 and 300 turns per meter.

When the degree of twisting of the hollow fibres is high, the cross-section of a fibre through a plane perpendicular to the axis of the helices does not rigorously have the shape of an ellipse, but that of a kidney bean with the long axis incurved.

In exchange apparatuses for effecting dialysis, for example, it is advantageous that the hollow fibres should be in tangential contact only with a single other hollow fibre, or over only a part of the length of the two hollow fibres, so as to prevent the formation of a dead volume between them. Thus, with this type of apparatus, cords consisting of only two hollow fibres, twisted with practically no twist in the fibres themselves, are advantageously used.

With apparatuses for separating fluids, the dead spaces between fibres possess fewer disadvantages than in exchange apparatuses, and cords consisting of three hollow fibres, twisted with practically no twist in the fibres themselves are then preferably used. Of course, it is possible for elementary cords of hollow fibres to be corded to one another with practically no twist. For example, it is possible to cord together, without a twist in a positive direction, three cords each consisting of two hollow fibres which have been corded beforehand without a twist in a negative direction.

The twist-free cords of hollow fibres advantageously comprise hollow fibres twisted together with one and the same pitch, but they can optionally comprise hollow fibres twisted with different pitches. The hollow fibres can be corded over only a part of their length, but they are advantageously corded over their entire length. The hollow fibres of one and the same cord can be twisted with limited, advantageously equal but sometimes different twists on themselves.

The hollow fibres of a cord according to the invention are subjected to stresses due to their twisting together with one another. However, it has been found that these stresses are low relative to the stresses due to any twist in the fibres themselves and that they bardly weaken and deform the hollow fibres at all. Thus, for example, in a cord formed of two hollow fibres, when $\alpha = 18°$, there is no more than 6% elongation from the outermost generatrix to the innermost generatrix. For the latter value, $L = 10.76\ d$ and $p = 9.56\ d$. With $d = 0.5$ mm, a twist-free coil of 200 turns per meter is produced by revolving the fibres by $2\pi/5$ on themselves in the reverse direction to the direction of twisting. The fibres are then not subjected to greater stress than if they were twisted with touching turns on a drum of diameter 160 mm.

It is also observed that the cords of hollow fibres with limited twist in the fibres themselves possess an increased elasticity which reduces the risk of rupture. They make it possible to compensate for dimensional variations due to the uptake of moisture, the increase in the radius causing a shortening which substantially compensates for the axial elongation. It is also possible to reduce the thickness of the walls, and, for example in the case of haemodialysis, this makes it possible to reduce the dialytic resistance to small molecules.

The apparatuses and cords described above are especially advantageous when they are applied in artificial kidneys and/or lungs.

Some mehtods of twisting the fibres to form the cords will now be described. In the figures relating to the descriptions of these processes (FIGS. 3 to 9 and 12), the hollow fibres are represented by a single line. The term bobbin is used to denote any support on which fibres are wound in any way whatsoever. The initial bobbins of hollow fibres are generally those which can normally be obtained simply after spinning.

METHOD A

According to this method, at least two fibres wound on at least one bobbin preferably turning on its axis are unwound axially and pass through a yarn guide, the cord thus formed being preferably wound up substantially orthogonally to the axis of a cylindrical or conical receiving device such as a bobbin or drum. This process leads to cords such as those of FIGS. 1 and 2, but with a degree of twist which is generally not zero.

Different variants of this process A can be envisaged.

Figure 3:
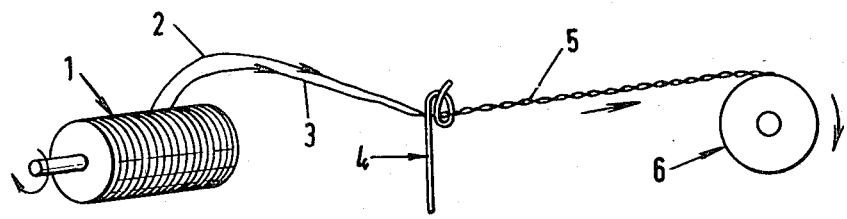

According to a variant $A_1$, represented in FIG. 3, two hollow fibres 2 and 3, wound beforehand on a single bobbin 1 are unwound axially, these two fibres pass through a yarn guide 4, and the cord 5 thus formed is wound on a bobbin 6, substantially perpendicular to the axis of the said bobbin 6; a rotational movement is preferably imparted to the bobbin 1 when it is desired to obtain a sufficiently high degree of twisting of the hollow fibres in the cord.

This method implies that, initially, two hollow fibres have been wound on one and the same bobbin. According to a variant, the starting component is a bobbin having a winding or more than two hollow fibres, and this leads to a cord with more than two strands.

Figure 4:
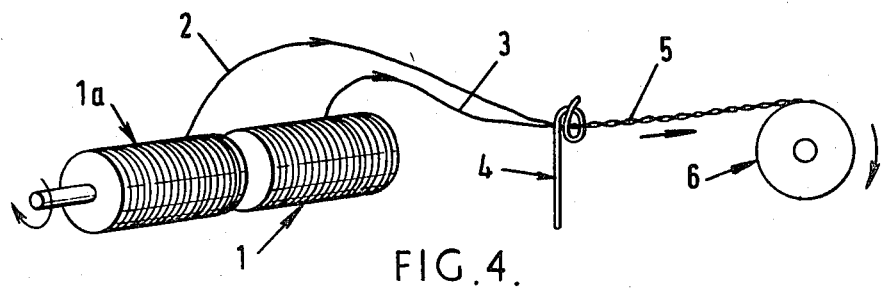

According to a variant $A_2$, shown in FIG. 4, two fibres 2 and 3, each initially wound on a different bobbin 1 and 1a, these bobbins being coaxial, are unwound axially. This variant $A_2$ has the advantage, relative to the variant $A_1$, of not requiring two different hollow fibres be wound initially on one and the same bobbin 1.

Figure 5:
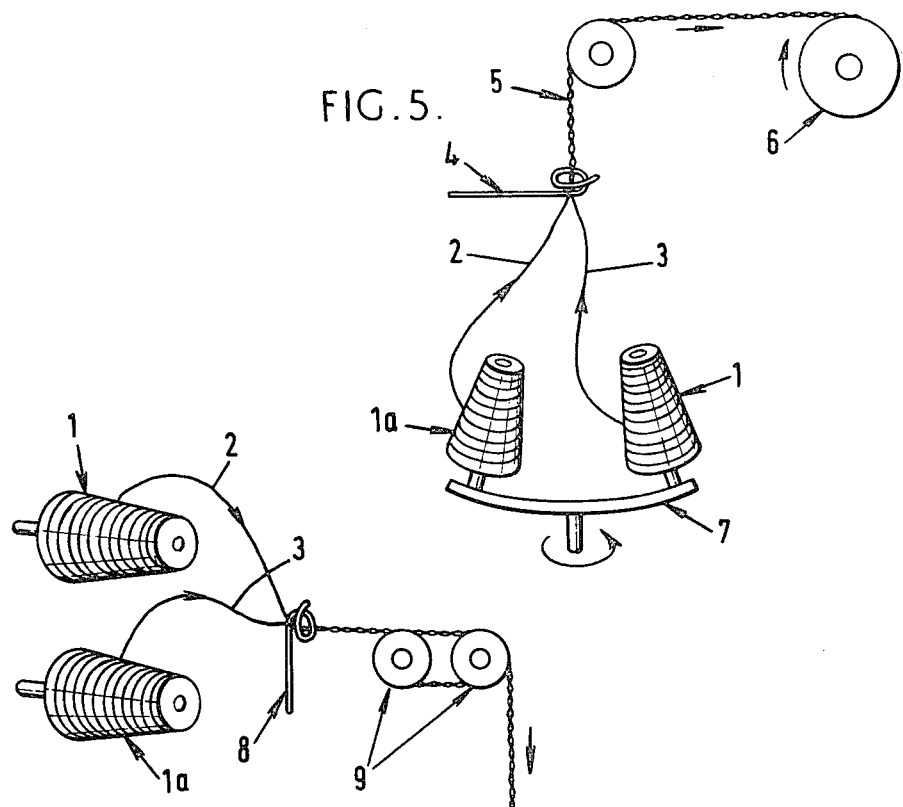

According to a variant $A_3$, illustrated in FIG. 5, two hollow fibres 2 and 3, each wound initially on a different bobbin 1 and 1a, are unwound axially as before, but in this particular case, the two bobbins 1 and 1a are not coaxial but are positioned coaxially with their axis of rotation; these bobbins 1 and 1a are in fact carried by a support 7 to which a turning movement is preferably imparted so as to provide the fibres with a sufficiently high degree of twisting. By imparting to these bobbins a turning movement relative to the support 7, it is possible to choose the degree of twist at will.

This method $A_3$ possesses substantially the same advantages as the method $A_2$.

METHOD B

Figure 6:
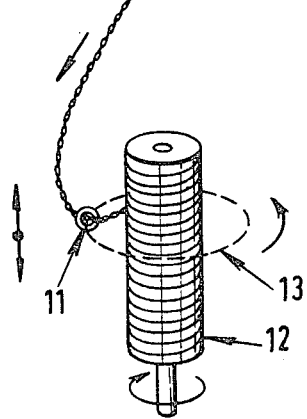

According to this method, at least two hollow fibres wound on at least one fixed bobbin are unwound axially or non-axially, and then, after passing through a yarn guide, the cord of hollow fibres is wound up axially on a receiving bobbin. This method, which leads to cords of the same type as before, is represented in FIG. 6.

Two hollow fibres 2 and 3 are unwound axially from two fixed bobbins 1 and 1a; after passing through a yarn guide 8, these hollow fibres are carried along by passing over two rotating cylinders forming "a pair" 9; the two hollow fibres then pass successively through a fixed yarn guide 10 and through a free running ring-and-traveller yarn guide 11 and are then wound axially on the rotating receiving bobbin 12. The path of the traveller 11 on the ring is represented by a broken line 13. A vertical reciprocating movement is imparted to the traveller 11, and this makes it possible to distribute the cord evenly over the bobbing 12 which rotates on its axis in order to give a sufficiently large coil.

METHOD C

According to this method, which also leads to cords of the same type as above, at least two hollow fibres, wound on a fixed bobbin, are unwound axially and are carried along by a rotating yarn guide, and then the cord formed is preferably wound up perpendicular to the axis of a cylindrical (or conical) receiving bobbin.

According to a variant $C_1$, the rotating yarn guide is placed on a rotating arm and the hollow fibre passes directly from the fixed bobbin to the yarn guide.

Figures 7, 8:
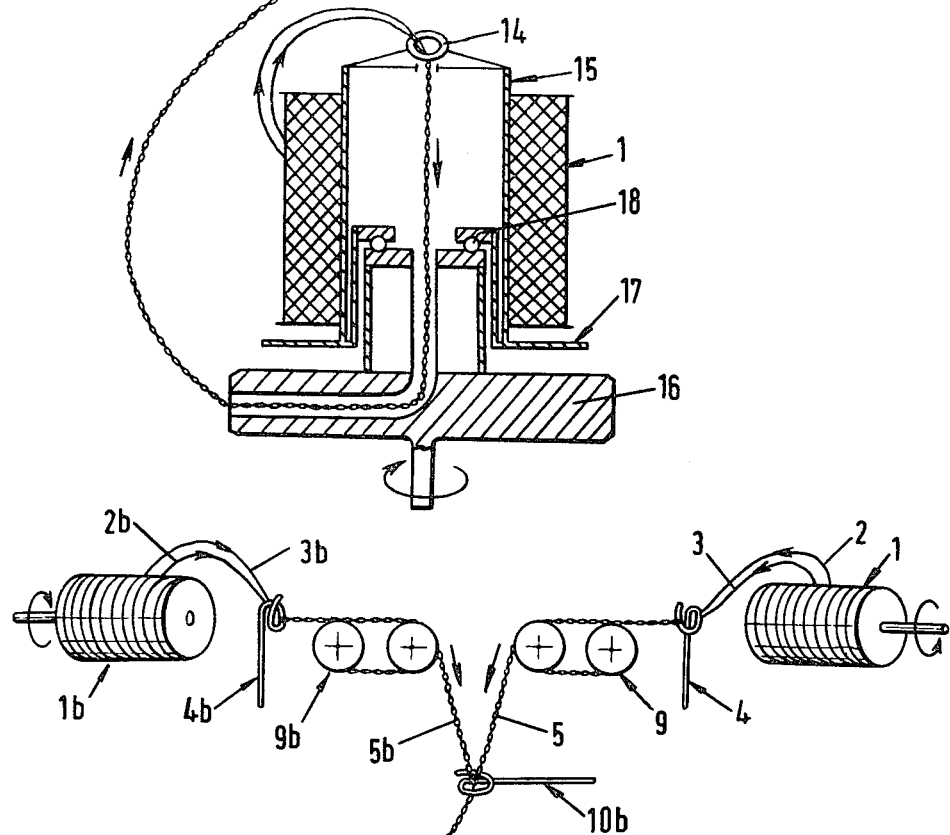

According to a variant $C_2$, represented in FIG. 7, the hollow fibres, at the outlet of the fixed bobbin, pass through the axis of this same bobbin before gaining access to the rotating yarn guide. This method makes it possible to form the fibres into a cord with double the number of turns with which the yarn guide rotated.

In FIG. 7, two fibres wound on a bobbin 1 are unwound axially, pass through the yarn guide 14 firmly fixed to the support 15 of the bobbin 1, through a channel provided in the rotating plate 16 and through a yarn guide 10, and the cord is then wound up on the receiving bobbin 6 perpendicular to its axis. The bobbin 1 and its support 15 rest on an intermediate support 17 which itself rests on a ball bearing 18; in this way, because of the inertia, the bobbin 1 is fixed during the rotation of the plate 16, secured to the ball bearing 18. The rotating plate 16 thus acts as a rotating yarn guide.

METHOD D

According to this method, two helices with the same direction of twisting and the same degree of twisting are imbricated into one another, these two helices individually consisting of a cord of n hollow fibres each, n being a positive integer, preferably less than 4. Once imbricated into one another, the two helices have one and the same axis and are simply staggered relative to one another by half their pitch.

According to an embodiment $D_1$ of this method, two twisted hollow fibres or two cords each of n hollow fibres, kept twisted by a suitable tension, are placed side by side longitudinally, and then this tension is relaxed, preferably whilst keeping the hollow fibres fixed together at one of their ends. Under these conditions, each of the twisted hollow fibres or cord of hollow fibres, which naturally have a tendency to untwist of their own accord, become twisted on one another during this untwisting process. The characteristic and advantage of such a two-helix cord, of 2 n hollow fibres in all, are its stability; the hollow fibres therein are relaxed, that is to say twisted with practically no stress, so that the deformations of the cross-section of the fibres (flattening, collapse and the like) are reduced to a minimum; moreover; these cords can be handled easily without becoming untwisted and without it being necessary to keep them fixed.

According to a variant $D_2$ of this method, a single hollow fibre or a bundle of n parallel hollow fibres is twisted on itself; then, whilst keeping this or these fibres fixed at their middle, their two ends are brought close together until the two halves of the fibre are substantially rectilinear and are placed side by side against one another over their entire length. It is of course necessary to hold the fibres under tension in order to keep them substantially rectilinear and to prevent them from becoming untwisted. When this tension is relaxed, preferably by ceasing to fix the fibres at what was their middle, a self-coiling into a helix is observed, giving rise, as before, to a cord consisting of two helices coiled on one another.

This variant $D_2$ has the advantage relative to the variant $D_1$ of leading to more reliable and more reproducible results because the two helices, before imbrication, can be better held in position beside one another.

According to a variant $D_3$ of this method, it is possible to work continuously in the following way: two hollow fibres or two groups each of n hollow fibres are twisted individually, by any means which is in itself known, to the same degree (same number or turns/m), then the two cords thus produced are joined by a yarn guide, and then the whole is wound up axially on a receiving bobbin, the direction and the rate of rotation of which are chosen so as to make it possible for the two elementary cords to become somewhat untwisted, the mutual imbrication of the two helices taking place during this untwisting process. Of course, and preferably, the rate of rotation of the receiving bobbing is chosen so as to correspond precisely to the natural untwisting which the two elementary cords would exhibit in a method such as $D_2$.

The method $D_3$ can, for example, be employed in an apparatus like that which is described in FIG. 8 and which represents the manufacture of a cord according to the invention comprising four hollow fibres.

Two bobbins 1 and 1b, each carrying a winding of two hollow fibres 2, 3 and 2b, 3b respectively are unwound axially so as to form, after passing through the yarn guides 4 and 4b, two cords 5 and 5b, each consisting of two hollow fibres twisted in a helix in the same direction as each other. These cords 5 and 5b are carried along by two pairs of rollers 9 and 9b, and are placed side by side or combined by means of a yarn guide 10b, and this causes them to become imbricated into one another so as to form the cord 19 after passing through a traveller 11b turning freely on a traveller 13; the rate of rotation of the receiving bobbin 12b is chosen so as to correspond to the natural untwisting which the cords 5 and 5b would assume if they were imbricated into one another in a method such as $D_2$.

METHOD E

This method leads to cords comprising a non-corded yarn and at least one hollow fibre twisted around. It differs from the method A, and especially from its variants $A_1$ and $A_2$, by the fact that the non-corded yarn is brought into the cords via the axis of the bobbins supporting the hollow fibres and that, furthermore, it is possible to use only one bobbin with a hollow fibre.

Figure 9:
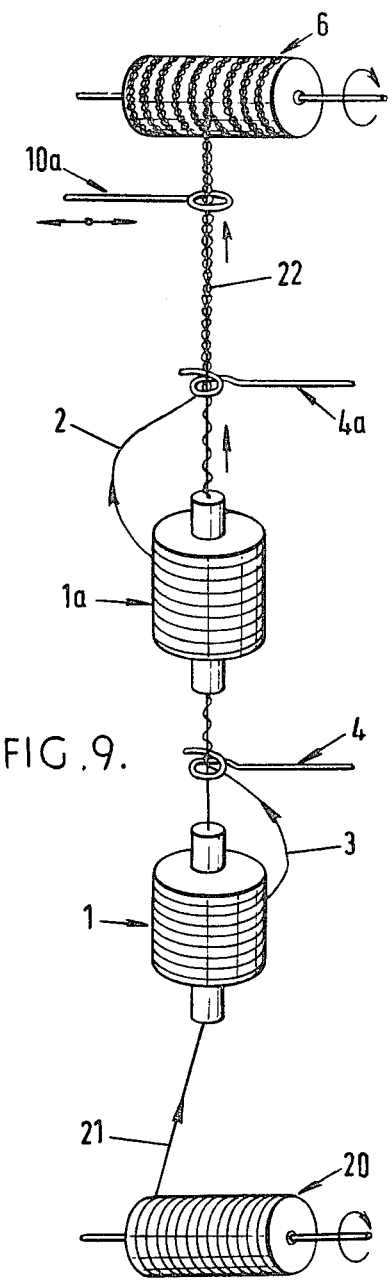

This method is illustrated in FIG. 9. The non-corded yarn 21, initially wound on a bobbin 20, is unwound perpendicular to the axis of this bobbin and passes successively through the axes of the bobbin 1 and then bobbin 1a. These bobbins are unwound axially: they are rotating in the opposite direction or preferably in the same direction, the rate of rotation determining the degree of twisting of the fibres 2 and 3 which unwind therefrom. These same fibres 2 and 3 are combined with the non-corded yarn 21 by means of yarn guides 4 and 4a. The method is carried out, in practice, so that the fibres 2 and 3 form non-touching helices. The cord 22 finally obtained is spread out, by means of the yarn guide 10a (to which a reciprocating movement is imparted), over the receiving bobbin 6 where it winds up perpendicular to the axis.

METHOD F

It has been found that it is possible to produce twist-free cords of hollow fibres if the hollow fibres are placed on bobbins which are driven in the following way. Each bobbin describes an anti-planetary movement produced by connecting it, for example, to a planet gearwheel of radius r which rolls without slipping on a fixed sun gearwheel of radius R by means of a reversing planet gearwheel of any radius whatsoever.

Now, the planet gearwheel turns on itself, per complete revolution, by $(1-R/r)$ turn. In order to produce a twist-free cord of hollow fibres, the following relationship must apply: $1-R/r=4\alpha/360$, $\alpha$ being determined by the desired pitch and being expressed in degrees. The above relationship makes it possible to calculate the ratio R/r and, if, for example, $\alpha=18°$ is chosen with a fixed gearwheel of 80 teeth, it is found that the planet gearwheel must have 100 teeth, it being possible for the reversing planet gearwheel to have any number of teeth whatsoever.

The hollow fibres are unwound simultaneously from the bobbins associated with the planet gearwheels through a yarn guide where the cord forms. The latter is wound on a drum after passing through a guide to which a lateral reciprocating movement is imparted in order to ensure that the cord is distributed evenly over the drum.

Of course, one and the same drum can receive several cords simultaneously, for example two cords wound in the opposite direction.

The bobbins connected to the planet gearwheels describe circles, the axis of which is identical to the axis of the sun gearwheel and can advantageously be identical with the axis of the cord being formed.

It is preferred that the bobbins of hollow fibres connected to the planet gearwheels should be cylindrical bobbins. It is also preferred to unwind the hollow fibres from these bobbins by pulling them off perpendicularly to the axis of the bobbins, or more precisely in an average direction perpendicular to their axis, the hollow fibre coming from a point travelling at any instant between the two ends of the bobbin. A cord thus formed from several hollow fibres is subjected to practically no torsional stress at any instant.

A cord is advantageously formed by twisting hollow fibres into helices according to a constant pitch. To achieve this, it is possible to have the rate of rotation of the drum which receives the cord controlled by the speed of the rotor driving the unwinding bobbins. For example, it is possible to have the motor driving the drum which receives the cord controlled by a tachometric dynamo or by an optical turn counter. Advantageously, these rates are kept constant in order to prevent sudden changes in tension in the hollow fibres.

By way of example, a particular way for carrying out such a method has been represented in FIG. 12, diagrammatically and not on any particular scale.

A system of anti-planetary gears is mounted in a casing 7 turning on a shaft 24. The casing 7 is driven by a motor 25 and a sun gearwheel 26, firmly attached to the shaft 24, is fixed. Two reversing gearwheels 27 and 27' mesh with the sun gearwheel and two planet gearwheels 28 and 28' mesh with the reversing gearwheels and drive bobbins of hollow fibres 1 and 1a contained in secondary casings 29 and 29'. The casings 29 and 29' are driven with a rotational movement by secondary shafts 30 and 30' connected to the planet gearwheels 28 and 28' by means of universal joints 31 and 31', the shafts 30 and 30' being held in place by two arms 23 and 23' attached to the casing 7. In operation, bobbins 1 and 1a are unwound perpendicular to their axes and the hollow fibres 2 and 3 rejoin one another at the yarn guide 4 where the cord 5 forms and is wound on the drum 6 to which a reciprocating movement is imparted in order to ensure that the cords are distributed correctly. A second cord 5a, coming from an apparatus identical to that already described, becomes coiled on the drum 6, which makes it possible to place on this drum a juxtaposition of helices, the directions of which are alternately right-handed and left-handed. The drum 6 is driven by the motor 32 via a belt and electronic control means 33 have also been represented diagrammatically, which, on the basis of the rate at which the cord 5 passes, as measured by the tachometer 34, make it possible to adjust the rate of the motors 25 and 32 and, where appropriate, to trigger an alarm 35. A turning contact 36 enables one to check the rate of rotation of the casing 7. Furthermore, attached motors 37 and 37' make it possible optionally to control the rotation of the bobbins 1 and 1a, the rate of the motors 37 and 37' being itself adjusted by turning contacts fixed to the shafts 30 and 30'.

The following examples, which are given without implying a limitation, illustrate the invention and show how it can be carried out.

EXAMPLE 1

A—Production of the cord

By means of an apparatus like that of FIG. 3, a cord consisting of two hollow fibres is produced.

The hollow fibres are made of a copolymer of acrylonitrile and sodium methallyl-sulphonate. Their external diameter is 522 $\mu$ and their internal diameter is 352 $\mu$. Their wall is microporous so that, under a relative internal pressure of 0.5 bar, these fibres possess a flow rate to water of approximately 78 l/day m$^2$, the degree of rejection with respect to ovalbumin (molecular weight=45,000; used in the form of an aqueous solution of concentration 5 g/l containing 5.85 g/l of NaCl) is 100%.

These fibres are twisted at the rate of 40 t/m.

B—Production of a dialysis apparatus 945 cords, prepared as indicated under A (and thus containing 1,890 fibres) are placed parallel to one another so as to form a bundle of parallelepiped shape, the dimensions of which are as follows: cross-section 1 cm × 8 cm, useful length: 41.6 cm.

Figure 11:
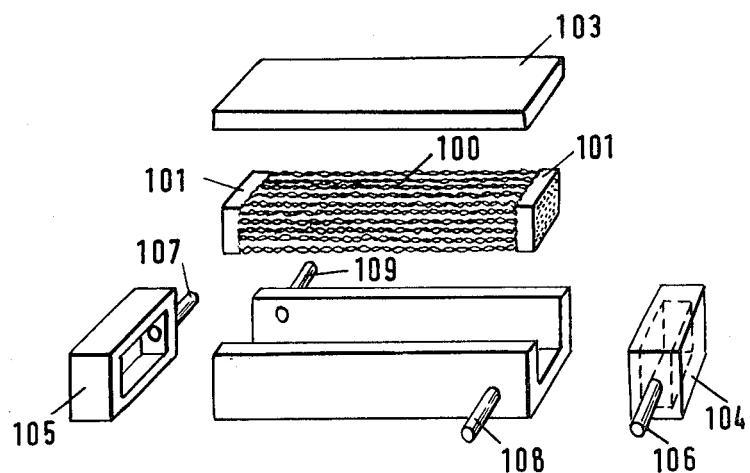
FIG. 11 is a perspective view of a fluid fractionating apparatus according to the invention.

An apparatus as illustrated in FIG. 11 is then made up. The bundle 100 has end walls 101 of epoxy resin formed thereon, and it is secured in a channel section core 102, the epoxy resin end walls sealing against the walls of the core to separate the interior of the hollow fibres from the exterior thereof within the core. The bundle of cords fits exactly into the channel-shaped core. A lid 103 is secured to the open side of the core and end caps 104, 105 close the ends, these end caps having inlet and outlet pipes 106, 107 in communication with the interior of the hollow fibres, while pipes 108, 109 communicate with the exterior of the hollow fibres.

The useful surface area for dialytic exchange is 102.48 dm² (surface area calculated by attributing the average diameter equal to half of the sum of the internal and external diameters to the hollow fibres).

C—Use

A dialysis operation is carried out at 37° C. for 6 hours using the apparatus produced under B.

A "product to be dialysed", containing the following constituents per liter, flows inside the hollow fibres via pipes 106, 107: 5.845 g of NaCl, 0.224 g of KCl; 0.152 g of MgCl₂.6 H₂O, 5.171 g of CH₃COONa.3 H₂O, 0.33 g of CaCl₂.6 H₂O and 1.5 g of urea.

Outside the hollow fibres there flows via pipes 108, 109, at a rate of 500 cm³/minute, a dialysate which is a saline solution which, at the inlet to the dialyser, has the same composition as that indicated for the product to be dialysed, the dialysate being however free from urea. After use (a single pass), the dialysate is discharged from the apparatus.

A solution of "the product to be dialysed" passes through the hollow fibres at a flow rate of 200 cm³/minute; it is conveyed to a graduated vessel and then recycled to inside the hollow fibres; the graduated vessel allows possible variations in the volume of the solution of the product to be dialysed to be detected, these variations being due to a secondary phenomenon of ultrafiltration through the walls of the hollow fibres; furthermore, when the volume of the product to be dialysed decreases, an equivalent volume of new solution (having the composition of the original product to be dialysed) is added so as to keep the quantity of the said product to be dialysed flowing inside the hollow fibres substantially constant.

Manometers make it possible to measure the pressures at the inlet and at the outlet of the dialyser, in the case of both liquids flowing.

In the solution of the product to be dialysed, the pressure has been adjusted to a value slightly higher than that of the dialysate outside the hollow fibres, this adjustment leading to an ultrafiltration of the said product to be dialysed of 500 cm³/hour.

The clearance C of the urea is measured periodically. C is given by the formula:

$$C = F \times C_I - C_O / C_I$$

in which:
F is the flow rate of product to be dialysed inside the hollow fibres,
$C_I$ is the concentration of urea at the inlet to the hollow fibres and
$C_O$ is the concentration of urea at the outlet from the hollow fibres.

In fact, the clearance gives the nominal flow rate of product to be dialysed which would be obtained if the apparatus used provided a product to be dialysed totally freed from urea, without the rate of removal of urea being altered. The clearance thus defined does not contain the fraction of urea removed by the ultrafiltration phenomenon.

During the experiment considered, a substantially constant clearance equal to 125 cm³/minute is observed for the urea.

Thereafter, the same experiment was carried out again, but with a flow rate of dialysate outside the hollow fibres of 1 l/minute; the clearance for urea is then 139 cm³/minute.

EXAMPLE 2

Example 1 is repeated, but with the following changes.

The solution of the product to be dialysed contains initially, as non-saline solutes, 0.05 g/l of vitamin $B_{12}$ and 0.1 g/l of inulin.

The clearance for inulin and vitamin $B_{12}$ is defined as above for urea.

The flow rate of product to be dialysed outside the hollow fibres being 500 cm³/minute, a clearance of 50 cm³/minute is observed in the case of vitamin $B_{12}$ and a clearance of 25 cm³/minute is observed in the case of inulin.

EXAMPLE 3 (comparison)

An apparatus with hollow fibres, of structure identical to that of Example 1, paragraph B, is produced, but using non-corded parallel fibres. The number of fibre is 2,000 which corresponds to a useful surface area of 108.45 dm². The fibres are also identical to those of Example 1.

Dialysis experiments are carried out under the same conditions as in Example 1 and 2.

The flow rate of dialysate outside the hollow fibres being 500 cm³/minute, the following clearances are observed:
urea: 84 cm³/minute,
creatinin: 69 cm³/minute,
vitamin $B_{12}$: 38 cm³/minute, and
inulin: 20 cm³/minute.

If these clearances are corrected in order to bring the useful surface area for dialytic exchange back to a value equal to that of Example 1, (values of) 80, 65, 36 and 19 are found respectively.

We claim:

1. An artificial kidney device comprising in combination:
(a) a multiplicity of cords placed parallel to and in contact with one another inside a jacket to form a bundle, each cord consisting of at least two and at most six hollow fibres of macromolecular selectively fluid permeable materials twisted together, wherein the degree of twist of each individual fibre on itself is substantially 1 revolution per turn of twisting of the fibres of the said cord, wherein the degree of twisting of the fibres to form each cord is between 5 and 50 turns per meter, wherein the external diameter of the fibres is less than 1 mm, wherein the fibres are open at each extremity of the bundle and are at the most in simple contact at least at intervals;
(b) means separating the interior of the hollow fibres from the exterior of the hollow fibres within the jacket, said means comprising a hard mass at each extremity of the bundle;
(c) pipes in communication with the interior of the hollow fibres and with the exterior of the jacket;
(d) pipes in communication with the exterior of the jacket and with the exterior of the fibres and enabling the fluid outside the fibres to flow from one hardened mass to the other hardened mass along said fibres.

2. An assembly of hollow fibres as claimed in claim 1, wherein the fibres are divided into two groups each consisting of n fibres, each group of n fibres being, in its entirety, twisted together in one direction in a helix to form a cord, the two cords being twisted with one another in the opposite direction in a curve similar to a helix to form a double cord.

3. Apparatus as claimed in claim 1, wherein the means for separating the interior of the hollow fibres from the exterior of the hollow fibres within the jacket comprise a hardened mass securing the at least one cord to the jacket.

4. Apparatus as claimed in claim 1, wherein there are at most six hollow fibres in each cord.

5. Apparatus as claimed in claim 1, wherein each cord consists of only two hollow fibres.

* * * * *